(12) United States Patent
Huang (10) Patent No.: US 8,493,657 B2
(45) Date of Patent: Jul. 23, 2013

(54) LIGHT SOURCE SWITCHING DEVICE ADAPTED FOR A PROJECTION SYSTEM

(75) Inventor: June-Jei Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 1042 days.

(21) Appl. No.: 12/331,766

(22) Filed: Dec. 10, 2008

(65) Prior Publication Data

US 2009/0153963 A1  Jun. 18, 2009

(30) Foreign Application Priority Data

Dec. 14, 2007 (TW) ................................. 96147930 A
Sep. 10, 2008 (TW) ................................. 97134679 A (51) Int. Cl.
*G02B 27/28* (2006.01)

(52) U.S. Cl.
USPC ................................. 359/484.04; 359/489.08

(58) Field of Classification Search
USPC 359/484.06, 489.07–489.09, 489.15–489.16, 359/485.06; 353/20
See application file for complete search history.

(56) References Cited

U.S. PATENT DOCUMENTS

| | | | |
|---|---|---|---|
| 6,487,014 B2 * | 11/2002 | Li | 359/484.04 |
| 6,920,258 B2 | 7/2005 | Tai | |
| 2003/0184864 A1 | 10/2003 | Bruzzone et al. | |
| 2005/0213051 A1 | 9/2005 | Smet | |
| 2006/0164726 A1 * | 7/2006 | Morejon et al. | 359/495 |
| 2008/0055493 A1 * | 3/2008 | Hanano | 349/9 |
| 2008/0231953 A1 * | 9/2008 | Young | 359/495 |
| 2011/0240961 A1 * | 10/2011 | Erchak et al. | 257/13 |
| 2011/0303926 A1 * | 12/2011 | Erchak et al. | 257/88 |

OTHER PUBLICATIONS

Office Action from corresponding Taiwanese Application No. 097134679 dated Jun. 28, 2012. Partial English translation attached.

* cited by examiner

*Primary Examiner* — Frank Font
(74) *Attorney, Agent, or Firm* — Grossman, Tucker, Perreault & Pfleger, PLLC (57) ABSTRACT

A light source switching device for use in a projection system is provided. The light source switching device comprises at least two light guiding devices and at least one phase switching device. The phase switching device is disposed between the two light guiding devices and adapted to be in one of a first status and a second status. When the first light travels into the light source switching device, the phase switching device is capable of being in the first status such that the first light is adapted to emit out from the outlet surface. When the second light travels into the light source switching device, the phase switching device is capable of being in the second status such that the second light is adapted to emit out from the outlet surface. With the switching operation of the phase switching device, the plural lights provided by plural light sources would be selected and uniformized by the light source switching device.

12 Claims, 7 Drawing Sheets

LIGHT SOURCE SWITCHING DEVICE ADAPTED FOR A PROJECTION SYSTEM

This application claims priority to Taiwan Patent Application No. 096147930 filed on Dec. 14, 2007, and No. 097134679 filed on Sep. 10, 2008, which are incorporated herein by reference in their entirety.

CROSS-REFERENCES TO RELATED APPLICATIONS

Not applicable.

BACKGROUND OF THE INVENTION

1. Field of the Invention

The present invention relates to a light source switching device for use in a projection system and particularly relates to a light source switching device that supplies light to a projection system by selecting different light sources according to a particular time sequence.

2. Descriptions of the Related Art

To reduce the power consumption and shrink the volume of the device, many projection systems have adopted light emitting diodes (LEDs) as the light source. Because the LEDs feature a short startup time, the use of the LEDs in a projection system may overcome the slow startup time of conventional high pressure mercury lamps. However, the use of a light source is restricted by the etendue conservation law which means that only the light falling within a limited light source area and a limited angular range is effective. Consequently, simply adding more LEDs will make no improvement to the brightness of an etendue limited projection system. Therefore, improving both the brightness and the efficiency of the light source using LEDs has long been a bottleneck to be broken through for the industry.

Figure 1:
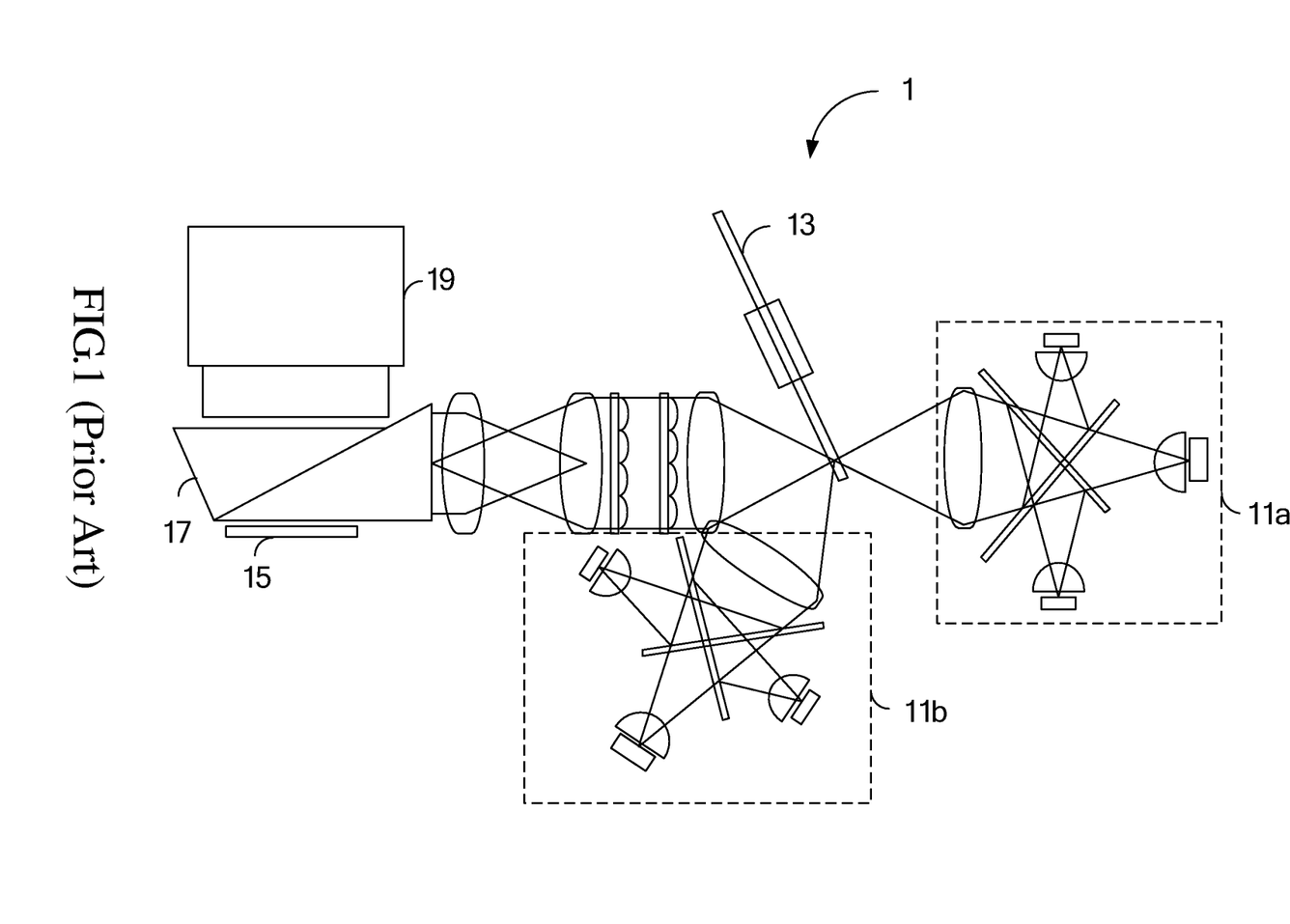
FIG. 1 is a schematic view of a conventional projection system.

FIG. 1 illustrates a conventional projection system which drives the LEDs with intermittent pulses and improves the brightness by inputting a larger current. The projection system 1 comprises a first LED module 11a, a second LED module 11b, a mirror wheel 13, a motor (not shown), a digital micromirror device (DMD) 15, a prism 17 and a projection lens 19. Each of the LED modules 11a, 11b comprises red LED, green LED and blue LED (not shown) which alternately emit light to supply light. The mirror wheel 13 is disposed between the two LED modules 11a, 11b.

The mirror wheel 13 comprises a plurality of alternately disposed reflective sectors and transmissive sectors which rotate about an axis thereof. When the first LED module ha emits light, the motor rotates one of the transmissive sectors of the mirror wheel 13 to a location corresponding to the light direction exiting from the first LED module 11a, so that the light travels through the transmissive sector and emits out in an output direction. On the other hand, when the second LED module 11b emits light while the first LED module 11a ceases emission, the motor rotates one of the reflective sectors of the mirror wheel 13 to a location corresponding to the light direction exiting from the second LED module 11b, so that the light is reflected and emits out in the output direction. In this way, the two LED modules 11a, 11b can supply the desired light in a rapid alternating order and results in an almost continuous light as perceived by naked eyes.

However, during operation, since the mirror wheel 13 consists of a plurality of alternately disposed reflective sectors and transmissive sectors, a number of border regions are inevitably formed therebetween. In case light from either LED modules impinges entirely or partly on such a border region, a portion of the light will not only be lost, but the instantaneous flux will also be degraded. To avoid the light loss, light from the LED modules must be controlled in such a way to keep away from the border regions as far as possible. However, since the two LED modules have their positions fixed beforehand, the only solution is to switch off a current operating LED module in advance when the border region of the mirror wheel 13 is approaching the current light beam and then switch on the opposite LED module immediately after the border region of the mirror wheel 13 passes the location corresponding to the light direction exiting from the opposite LED module. In other words, when the border regions are rotated to the locations corresponding to the light emitting direction of the LED modules, it shall be accompanied with an turned-off state of the LED modules as precisely as possible. Only after the border region passes the location corresponding to the light direction exiting from the LED modules can one of the LED modules be allowed to emit light.

However, the LED module provides a highly diffusive light beam that is different from a collective light beam provided by an ellipsoidal lamp or a parallel light beam provided by a parabola lamp. Hence, a light beam projected by an LED module will actually occupy a substantial area on the mirror wheel 13, rendering the aforesaid solution of switching the LED modules on and off impractical. What's more, when skipping the border regions, the numerous borders regions on the mirror wheel 13 will create a substantial unusable area on the mirror wheel 13, which will undoubtedly exacerbate the discontinuity in the light flux and degrade the utilization factor the mirror wheel 13 significantly.

On the other hand, the operations of the mirror wheel 13 and the motor have to be coordinated to switch between the LED modules. Because switching the LED modules is accomplished using electric signals, the mirror wheel 13 and the motor have a slow startup response and are liable to calibration errors and abrasion. As a result, it is difficult to accurately coordinate the switching speed and time intervals of the LED light sources. Moreover, this structure purely depends on the mirror wheels integrating the light beams. Every additional mirror wheel may significantly increase the dimension of the projection system, so improving the brightness is limited as restricted by the requirements of this industry on the volume.

In summary, the conventional LED light source structure for use in a projection system suffers from a discontinuous light flux, a slow light source switching speed, bulky volume and complex element configuration. Accordingly, it is highly desirable in the art to provide a light source that allows fast switching between the light sources, has a smaller size and is simple in structural configuration.

SUMMARY OF THE INVENTION

One objective of this invention is to provide a light source switching device for use in a projection system adapted to alternately provide a first light and a second light. By using the light source switching device, the projection system can deliver an improved light intensity, a more continuous light flux, a faster light source switching speed, a smaller overall size and simpler element arrangement without the use of a mirror wheel. Additionally, this light source switching device may further be used as a light integration rod which can improve the brightness by several times even without increasing the etendue.

To this end, this invention provides a light source switching device comprising a first light guiding device, a second light guiding device and a phase switching device. The first light guiding device has a first incident surface and a second incident surface nonparallel to the first incident surface. The second light guiding device has an outlet surface. The phase switching device is disposed between the first light guiding device and the second light guiding device, and adapted to be in one of a first status and a second status. When the first light travels into the first light guiding device through the first incident surface, the phase switching device is capable of being in the first status thereof such that the first light is adapted to emit out from the outlet surface after traveling through the phase switching device and the second light guiding device. When the second light travels into the first light guiding device through the second incident surface, the phase switching device is capable of being in the second status thereof such that the second light is adapted to emit out from the outlet surface after traveling through the phase switching device and the second light guiding device.

To this end, this invention further provides a light source switching device comprising a first light guiding device, a second light guiding device, a third light guiding device, a first phase switching device and a second phase switching device. The first light guiding device has a first incident surface and a second incident surface nonparallel to the first incident surface. The second light guiding device has a third incident surface which is nonparallel to either the first incident surface and the second incident surface. The third light guiding device has an outlet surface. The first phase switching device is disposed between the first light guiding device and the second light guiding device, and adapted to be in one of a first status and a second status. The second phase switching device is disposed between the second light guiding device and the third light guiding device, and adapted to be in one of a third status and a fourth status. When the first light travels into the first light guiding device from the first incident surface, the first phase switching device is capable of being in the first status thereof such that the first light is adapted to travel through the second light guiding device, the second phase switching device and the third light guiding device after traveling through the first phase switching device, and meanwhile the second phase switching device is capable of being in the third status thereof such that the first light is adapted to emit out from the outlet surface after traveling through the second phase switching device and the third light guiding device. When the second light travels into the first light guiding device from the second incident surface, the first phase switching device is capable of being in the second status thereof such that the second light is adapted to travel through the second light guiding device, the second phase switching device and the third light guiding device after traveling through the first phase switching device, and meanwhile the second phase switching device is capable of being in the third status thereof such that the second light is adapted to emit out from the outlet surface after traveling through the second phase switching device and the third light guiding device. When the third light travels into the second light guiding device from the third incident surface, the second phase switching device is capable of being in the fourth status thereof such that the third light is adapted to emit out from the outlet surface after traveling through the second phase switching device and the third light guiding device.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 2A:
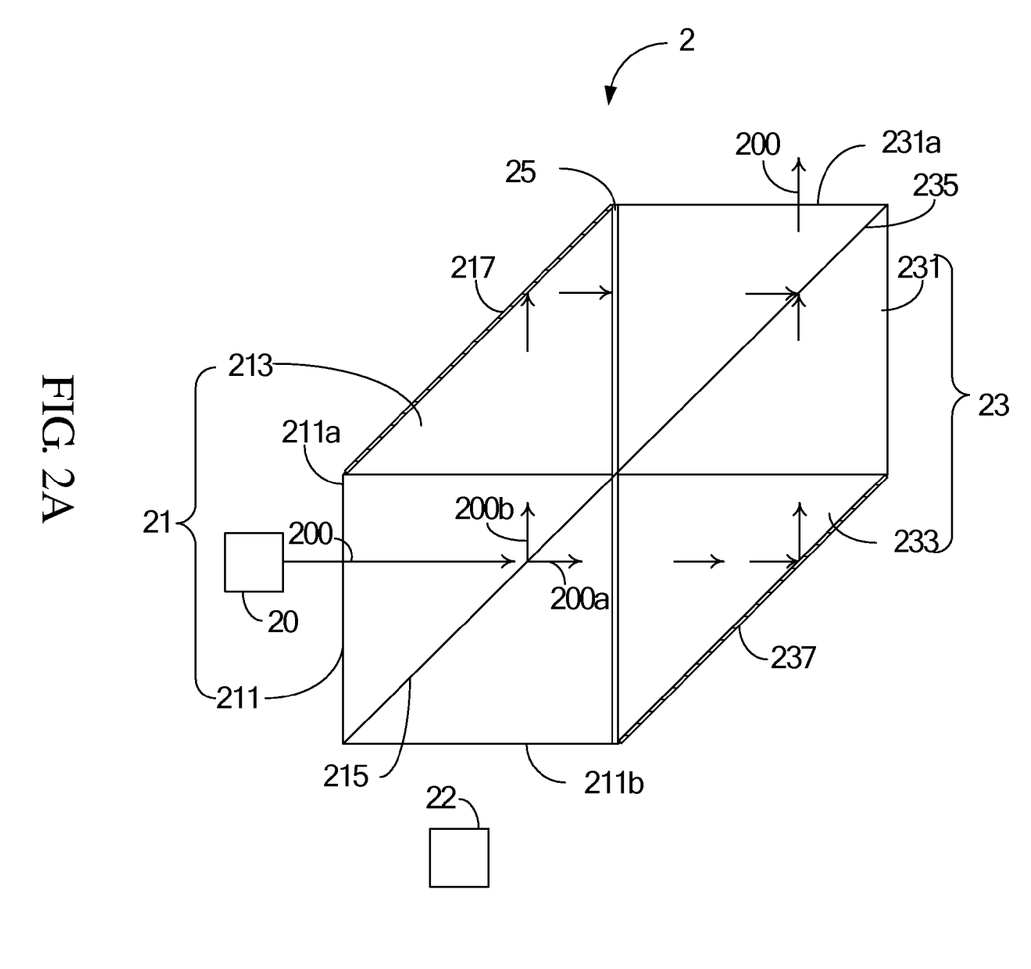
FIG. 2A is a schematic view illustrating how a light source switching device of a first embodiment of this invention guides a first light.
Figure 2B:
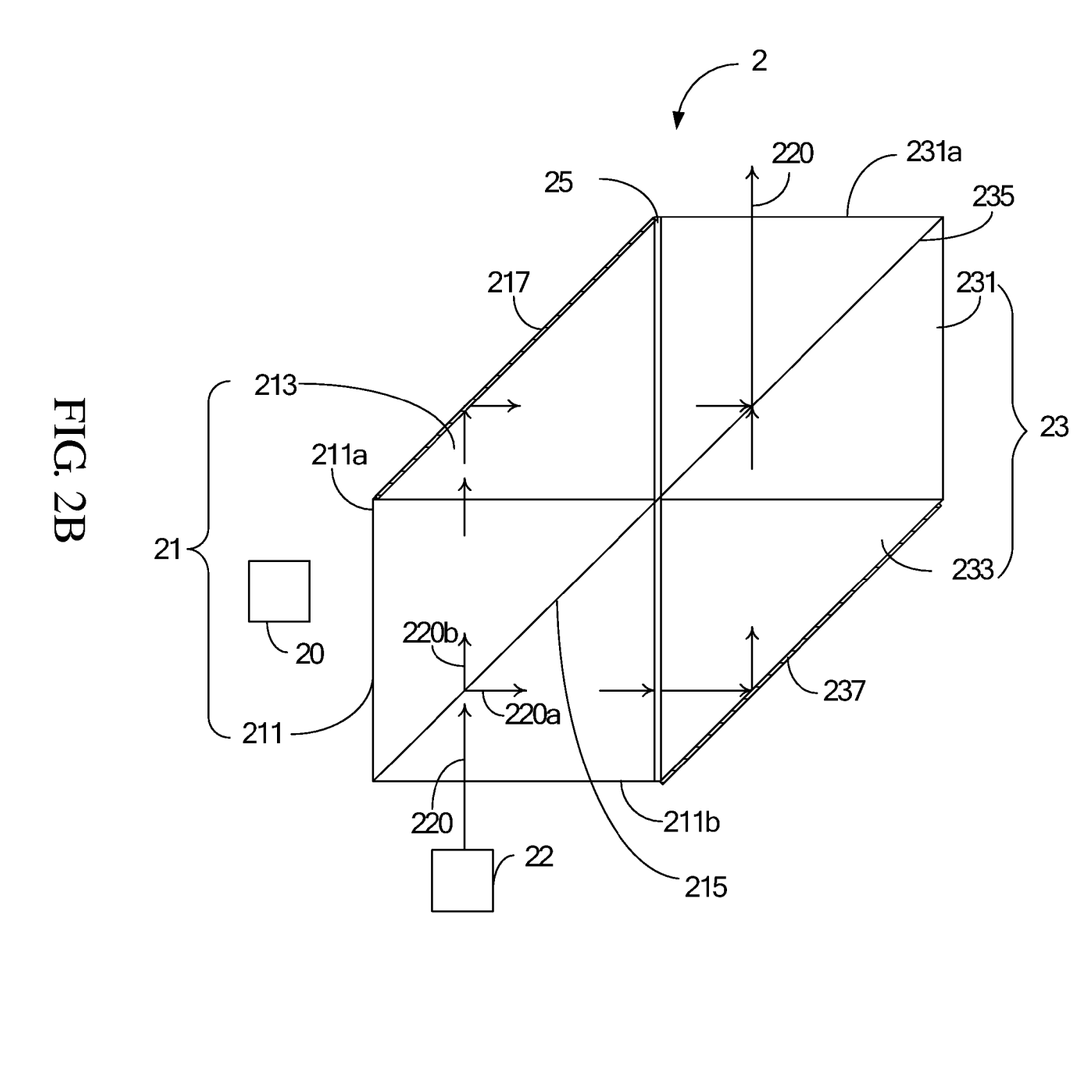
FIG. 2B is a schematic view illustrating how the light source switching device of the first embodiment of this invention guides a second light.

The first embodiment of this invention is a light source switching device 2, which comprises a first light guiding device 21, a second light guiding device 23 and a phase switching device 25, as shown in FIGS. 2A and 2B. The light source switching device 2 is applied to a projection system (not shown), which has a first light emitting diode (LED) module 20 and a second LED module 22 adapted to alternately provide a first light 200 and a second light 220. Each of the LED modules comprises a red LED (not shown), a blue LED (not shown) and a green LED (not shown). The first light 200 and the second light 220 are provided alternately according to a time sequence, and in this embodiment, are provided alternatively and complementarily according to a time sequence of exactly 50%-50%.

The first light guiding device 21 comprises a first polarizing device 211 and a first reflecting device 213 disposed adjacently to the first polarizing device 211. The first polarizing device 211 has a first incident surface 211a and a second incident surface 211b nonparallel to the first incident surface 211a. In this embodiment, the second incident surface 211b is disposed adjacent to and perpendicular to the first incident surface 211a. In this embodiment, the first polarizing device 211 comprises a first polarizing beam splitter (PBS) 215, which is in a cuboid form and has a first diagonal inclined plane. The first PBS 215 further has a first polarizing beam splitting plane disposed on the first diagonal inclined plane. The first reflecting device 213, which comprises a first reflector 217, is a triangular prism with a first inclined plane on which the first reflector 217 is disposed.

The second light guiding device 23 has an outlet surface 231a. The second light guiding device 23 comprises a second polarizing device 231 and a second reflecting device 233 disposed adjacently to the second polarizing device 231. The second polarizing device 231 defines the aforementioned outlet surface 231a, which is exactly perpendicular to either the first incident surface 211a or the second incident surface 211b. In this embodiment, an extension line of the outlet surface 231a is perpendicular to an extension line of the first incident surface 211a. In this embodiment, the second polarizing device 231 comprises a second PBS 235, which is in a cuboid form and has a second diagonal inclined plane. The second PBS 235 further has a second polarizing beam splitting plane disposed on the second diagonal inclined plane. The second reflecting device 233, which comprises a second reflector 237, is a triangular prism having a second inclined plane on which the second reflector 237 is disposed.

In this embodiment, both the first PBS 215 of the first polarizing device 211 and the second PBS 235 of the second polarizing device 231 are an MacNeille prism which is adapted to transmit the parallel polarized light (P-polarized light) but reflect the perpendicular polarized light (S-polarized light).

The phase switching device 25 is disposed between the first light guiding device 21 and the second light guiding device 23. The phase switching device 25 adapted to be in one of a first status and a second status, one of which indicates the phase switching device 25 being in the phase-switching status that changes the polarization direction of the light while the other indicates the phase switching device 25 being in the none-phase-switching status that does not change the polarization direction of the light. In this embodiment, the first status indicates a none-phase-switching status while the second status indicates a phase-switching status. The first status and the second status are provided according to a time sequence of the first light 200 and the second light 220. In this embodiment, the phase switching device 25 is a switchable retarder, which may be either a liquid crystal (LC) layer, a ferro-electric liquid crystal (FLC), a half wave plate filter, a Faraday rotator, a Pockels cell or a Kerr cell.

As shown in FIG. 2A, the first light 200 provided by the first LED module 20 is adapted to be split by the first PBS 215 into a first sub-transmitted light 200a and a first sub-reflected light 200b after traveling into the first polarizing device 211 of the first light guiding device 21 from the first incident surface 211a. When split by the first PBS 215, the first sub-transmitted light 200a is adapted to travel through the first PBS 215, while the first sub-reflected light 200b is adapted to be reflected by the first PBS 215. More specifically, after split from the MacNeille prism, the first sub-transmitted light 200a is a parallel polarized light (P-polarized light), while the first sub-reflected light 200b is a perpendicular polarized light (S-polarized light). Because the phase switching device 25 is capable of being in the first status, i.e., the none-phase-switching status, the polarization phase of the first sub-transmitted light 200a and the sub-reflected light 200b are both unchanged while traveling through the phase switching device 25.

After split from the first PBS 215, the first sub-transmitted light 200a is adapted to propagate in the following order: traveling through the phase switching device 25, traveling into the second light guiding device 23, being reflected by the second reflector 237, and traveling towards the second PBS 235. Subsequently, the first sub-transmitted light 200a is adapted to travel through the second PBS 235, which is a MacNeille prism, and emit out from the outlet surface 231a because the first sub-transmitted light 200a is parallel polarized light at this moment.

On the other hand, after split from the first PBS 215, the first sub-reflected light 200b is adapted to propagate in the following order: being reflected by the first reflector 217, traveling through the phase switching device 25, traveling into the second light guiding device 23 and traveling toward the second PBS 235. Subsequently, the first sub-reflected light 200b is adapted to be reflected by the second PBS, i.e., the MacNeille prism, and emit out from the outlet surface 231a because the first sub-reflected light 200b is perpendicular polarized light at this moment.

After being transmitted through and reflected from the second PBS 235 respectively, the first sub-transmitted light 200a and the first sub-reflected light 200b merge into the original first light 200 and emit out from the outlet surface 231a.

As shown in FIG. 2B, the second light 220 provided by the second LED module 22 is adapted to be split by the first PBS 215 into a second sub-transmitted light 220b and a second sub-reflected light 220a after traveling into the first polarizing device 211 of the first light guiding device 21 from the second incident surface 211b. When split by the first PBS 215, the second sub-reflected light 220a is adapted to be reflected by the first PBS 215, while the second sub-transmitted light 220b is adapted to travel through the first PBS 215. More specifically, after split from the MacNeille prism, the second sub-transmitted light 220b is a parallel polarized light, while the second sub-reflected light 220a is a perpendicular polarized light. Because the phase switching device 25 is capable of being in the second status, i.e., the phase-switching status, the polarization phase of the second sub-transmitted light 220b and the second sub-reflected light 220a are changed into a perpendicular polarized light and a parallel polarized light respectively.

After split from the first PBS 215, the second sub-reflected light 220a is adapted to propagate in the following order: traveling through the phase switching device 25, traveling into the second light guiding device 23, being reflected by the second reflector 237, and traveling towards the second PBS 235. Because the phase switching device 25 is capable of being in the second status at this moment, the second sub-reflected light 220a is converted into a parallel polarized light after traveling through the phase switching device 25 so that the sub-reflected light 220a is adapted to travel through the second PBS 235 and emit out from the outlet surface 231a subsequently.

On the other hand, after split from the first PBS 215, the second sub-transmitted light 220b is adapted to propagate in the following order: being reflected by the first reflector 217, traveling through the phase switching device 25, traveling into the second light guiding device 23, and traveling towards the second PBS 235. Because the phase switching device 25 is capable of being in the second status at this moment, the second sub-transmitted light 220b is converted into a perpendicular polarized light after traveling through the phase switching device 25 so that the sub-transmitted light 220b is adapted to be reflected by the second PBS 235 and emit out from the outlet surface 231a subsequently.

After being reflected from the second PBS 235 and transmitted through the second PBS 235 respectively, the second sub-transmitted light 220b and the second sub-reflected light 220a merge into the original second light 220 and then emit out from the outlet surface 231a.

In this embodiment, the light source switching device 2 is integrally formed. However, in other embodiments, the light source switching device 2 may also consist of several parts. Regardless of whether the light source switching device 2 is integrally formed or consists of several parts, it can be considered as a combination of a plurality of prisms. In this embodiment, the light source switching device 2 may further be used as a light integration rod, so the resulting light can be uniformized therein without the need of an additional light integration rod.

Figure 3:
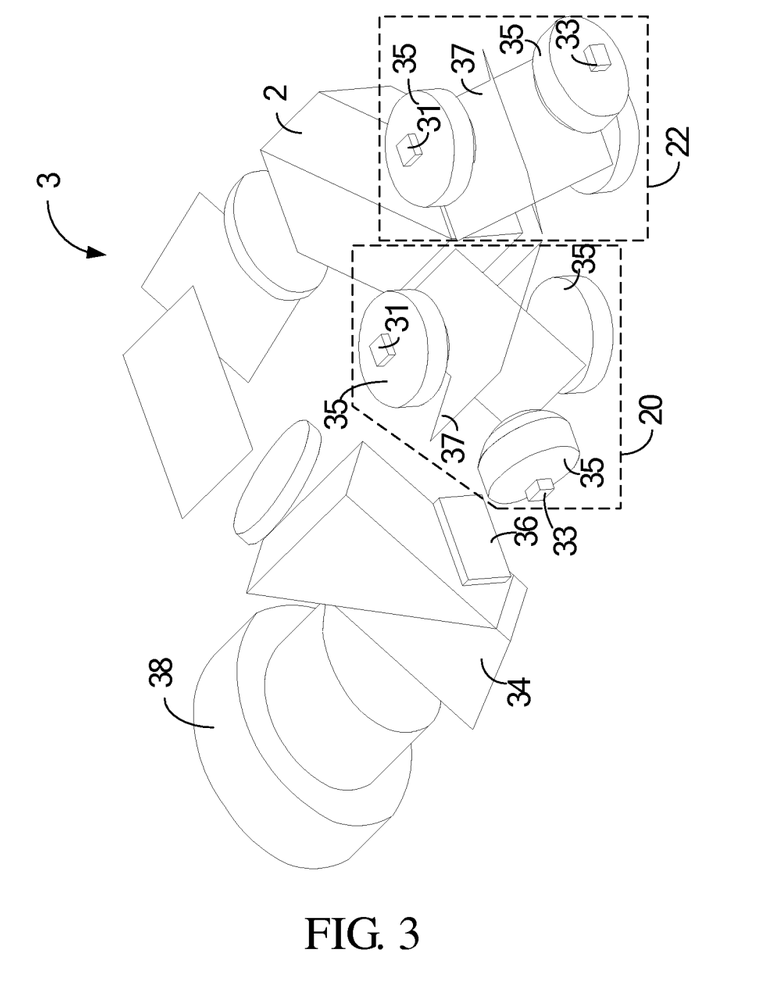
FIG. 3 is a schematic perspective view of a projection system utilizing the light source switching device of the first embodiment of this invention to guide light.

The light source switching device of the above embodiment may be applied to a projection system 3, a schematic perspective view of which is depicted in FIG. 3. The projection system 3 comprises the light source switching device 2 of the above embodiment, a first LED module 20, a second LED module 22, a total internal reflection (TIR) prism 34, a digital micromirror device (DMD) 36 and a projection lens 38.

Each of the LED module 20, 22 includes a red LED 31, a blue LED 33 and a green LED (not shown), several lenses 35, and an X-plate 37. The three LEDs of each LED module 20, 22 emit light according to a particular time sequence. The light is focused by the lenses 35 and split by the X-plate 37 into a first light and a second light. The first light and the second light are provided alternately according to a time sequence.

The first light and the second light from the first LED module 20 and the second LED module 22 propagate into the light source switching device 2 respectively according to the time sequence and are switched by the phase switching device (not shown) of the light source switching device 2 according to the time sequence. In addition, the lights are uniformized in the light source switching device 2 and then emit out respectively. The projected first light and the projected second light alternate with each other, and therefore may be considered as continuous light. The continuous light is then reflected by the TIR prism 34, imaged to the DMD 36 and then projected to a screen (not shown) by the projection lens 38.

Figure 4A:
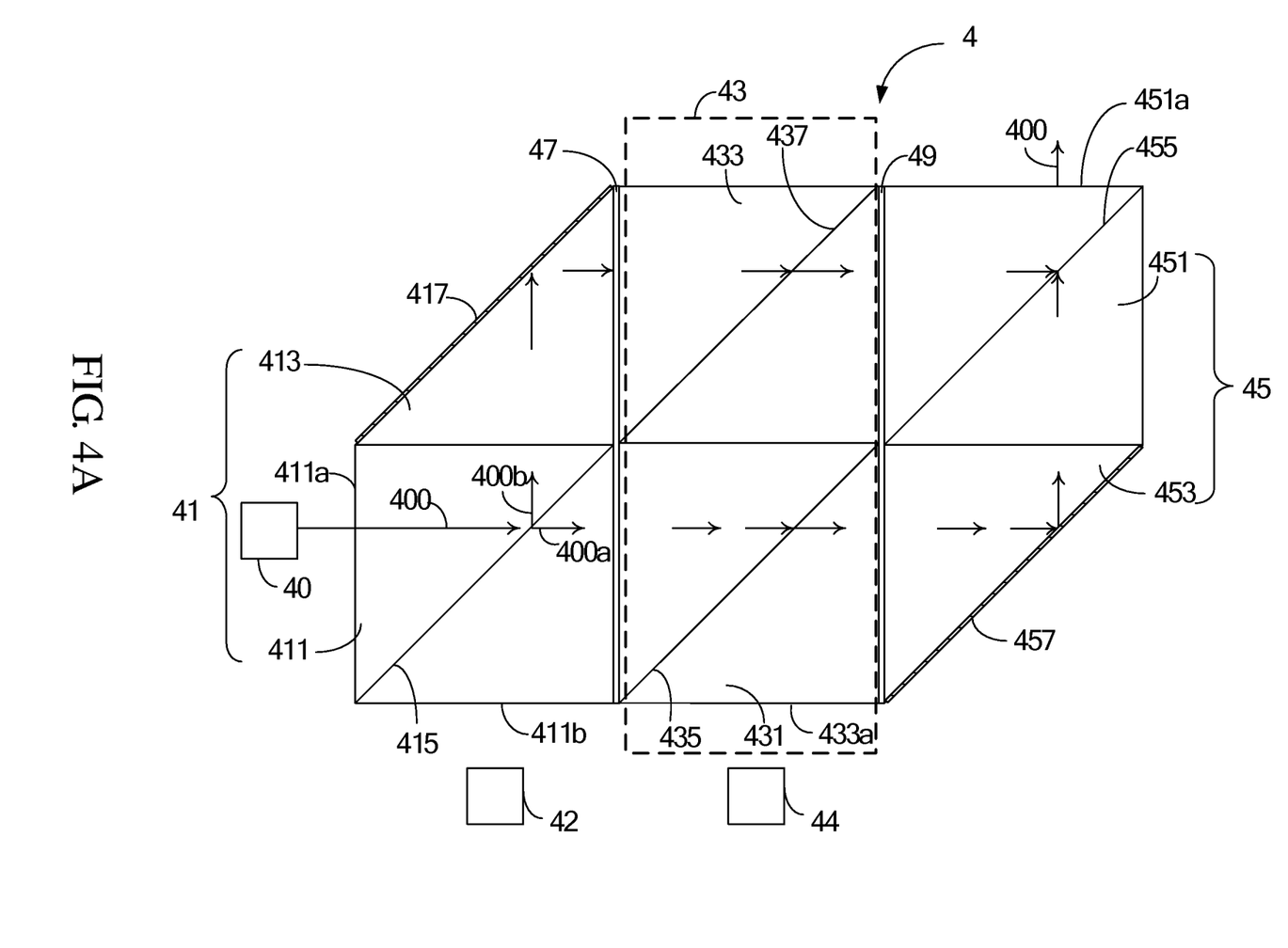
FIG. 4A is a schematic view illustrating how a light source switching device of a second embodiment of this invention guides the first light.
Figure 4B:
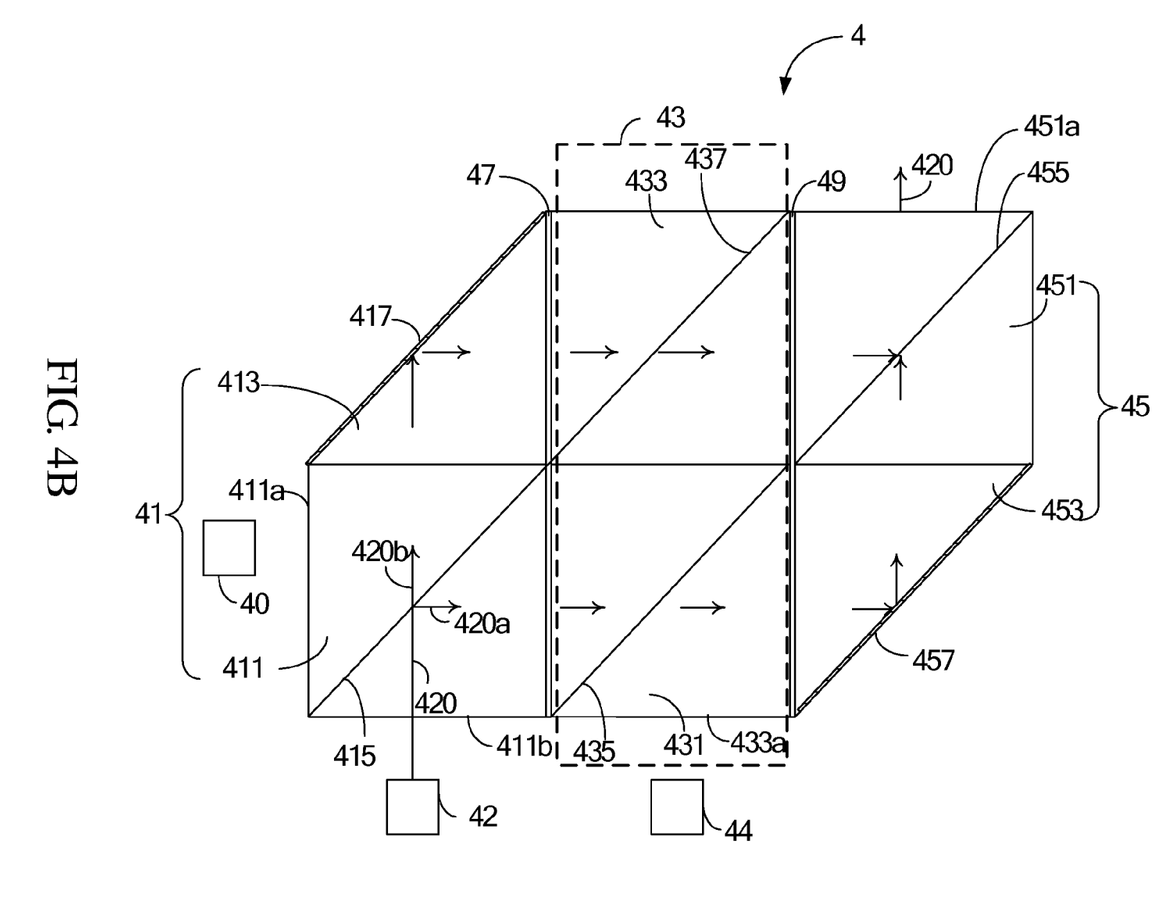
FIG. 4B is a schematic view illustrating how the light source switching device of the second embodiment of this invention guides the second light.
Figure 4C:
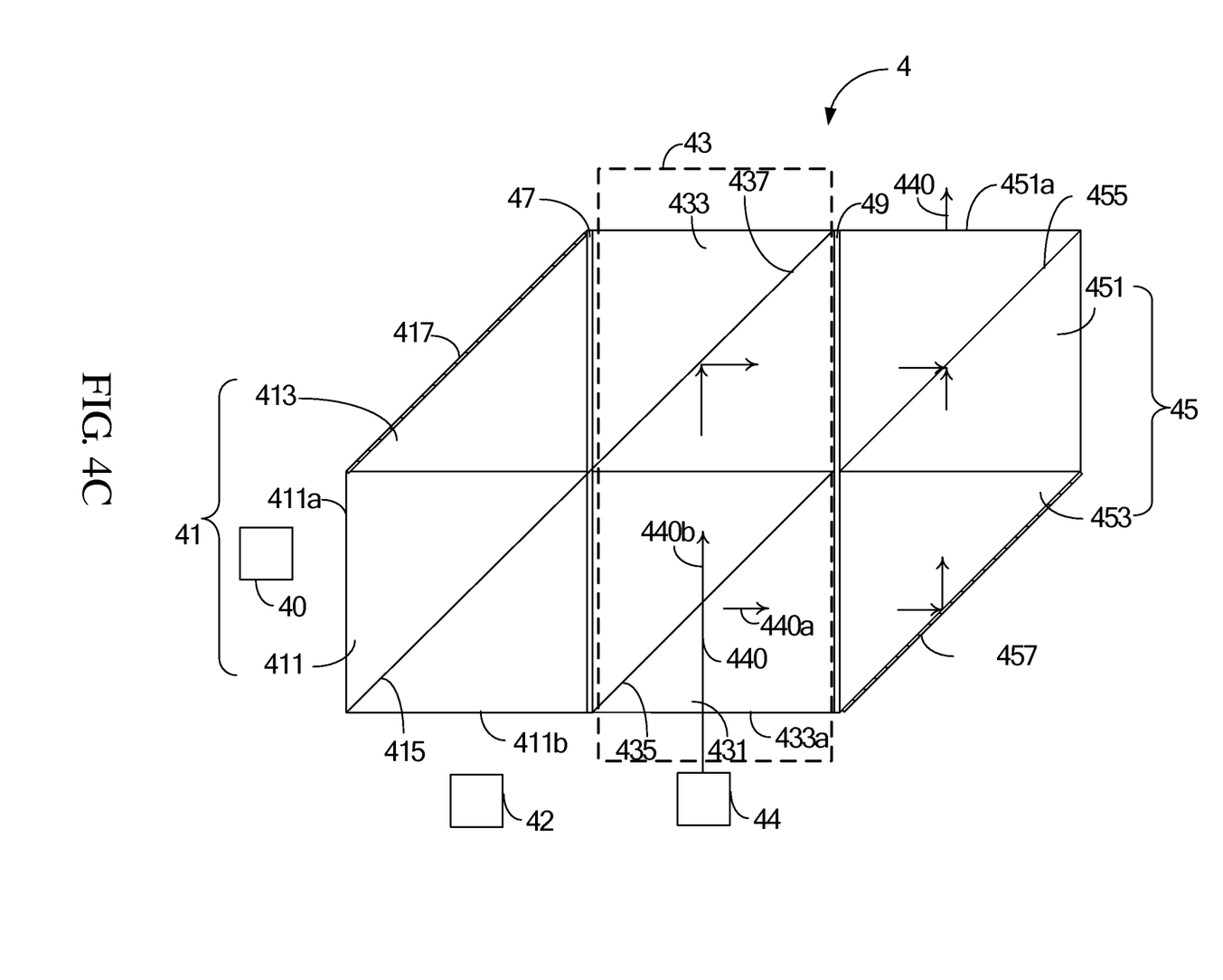
FIG. 4C is a schematic view illustrating how the light source switching device of the second embodiment of this invention guides the third light.

The second embodiment of this invention is also a light source switching device 4, which comprises a first light guiding device 41, a second light guiding device 43, a third light guiding device 45, a first phase switching device 47 and a second phase switching device 49, as shown in FIGS. 4A, 4B and 4C. The light source switching device 4 may also be applied to a projection system (not shown), which has a first light emitting diode (LED) module 40, a second LED module 42, and a third LED module 44 adapted to alternately provide a first light 400, a second light 420 and a third light 440. Each of the LED modules 40, 42 and 44 comprises a red LED (not shown), a blue LED (not shown) and a green LED (not shown). The first light 400, the second light 420 and the third light 440 are provided alternately according to a time sequence.

The first light guiding device 41 comprises a first polarizing device 411 and a first reflecting device 413 disposed adjacently to the first polarizing device 411. The first polarizing device 411 has and defines a first incident surface 411a and a second incident surface 411b nonparallel to the first incident surface 411a. In this embodiment, the second incident surface 411b is disposed adjacent to and perpendicular to the first incident surface 411a. In this embodiment, the first polarizing device 411 comprises a first PBS 415 which is in a cuboid form and has a first diagonal inclined plane. The first PBS 415 further has a first polarizing beam splitting plane disposed on the first diagonal inclined plane. The first reflecting device 413, which comprises a first reflector 417, is a triangular prism with a first inclined plane on which the first reflector 417 is disposed.

The second light guiding device 43 has a third incident surface 433a nonparallel to one of the first incident surface 411a and the second incident surface 411b. In this embodiment, the third incident surface 433a is adapted to be disposed on an extension line of the second incident surface 411b which is perpendicular to the first incident surface 411a. The second light guiding device 43 comprises a second polarizing device 431 and a third polarizing device 433 disposed adjacently to the second polarizing device 431. The second polarizing device 431 defines the aforementioned third incident surface 433a. In this embodiment, the third incident surface 433a is exactly disposed adjacently to the second incident surface 411b and perpendicular to the first incident surface 411a. In this embodiment, the second polarizing device 431 comprises a second PBS 435 which is in a cuboid form and has a second diagonal inclined plane. The second PBS 435 further has a second polarizing beam splitting plane disposed on the second diagonal inclined plane. The third polarizing device 433 comprises a third PBS 437 which is in a cuboid form and has a third diagonal inclined plane. The third PBS 437 further has a third polarizing beam splitting plane disposed on the third diagonal inclined plane.

The third light guiding device 45 has an outlet surface 451a. The third light guiding device 45 comprises a fourth polarizing device 451 and a second reflecting device 453 disposed adjacently to the fourth polarizing device 451. The fourth polarizing device 451 defines the aforementioned outlet surface 451a, and an extension line of the outlet surface 451a is exactly perpendicular to an extension line of the first incident surface 411a. In this embodiment, the fourth polarizing device 451 comprises a fourth PBS 455 which is in a cuboid form and has a fourth diagonal inclined plane. The fourth PBS 455 further has a fourth polarizing beam splitting plane disposed on the fourth diagonal inclined plane. The second reflecting device 453, which comprises a second reflector 457, is a triangular prism with a second inclined plane on which the second reflector 457 is disposed.

In this embodiment, the first PBS 415 of the first polarizing device 411 of the first light guiding device 41, the second PBS 435 of the second polarizing device 431 of the second light guiding device 43, and the fourth PBS 455 of the fourth polarizing device 451 of the third light guiding device 45 are all MacNeille prisms which are adapted to transmit the P-polarized light but reflect the S-polarized light. The only difference lies in that the third PBS 437 of the third polarizing device 433 of the third light guiding device 45 is a Bertrand-Feussner prism which is adapted to reflect the P-polarized light but transmit the S-polarized light.

The first phase switching device 47 is disposed between the first light guiding device 41 and the second light guiding device 43. The first phase switching device 47 is adapted to be in one of a first status and a second status, one of which indicates the first phase switching device 47 being in the phase-switching status that changes the polarization of the light while the other indicates the first phase switching device 47 being in the none-phase-switching status that does not change the polarization of the light. In this embodiment, the first status indicates a none-phase-switching status while the second status indicates a phase-switching status. The first status and the second status are provided according to a time sequence of the first light 400, the second light 420 and the third light 440.

The second phase switching device 49 is disposed between the second light guiding device 43 and the third light guiding device 45. The second phase switching device 49 is adapted to be in one of a third status and a fourth status, one of which indicates the second phase switching device 49 being in the phase-switching status that changes the polarization of the light while the other indicates the second phase switching device 49 being in the none-phase-switching status that does not change the polarization of the light. In this embodiment, the third status indicates a none-phase-switching status while the fourth status indicates a phase-switching status. Similarly, the third status and the fourth status are provided according to the time sequence of the first light 400, the second light 420 and the third light 440.

In this embodiment, the first phase switching device 47 and/or the second phase switching device 49 is a switchable retarder, which may be either an LC layer, a FLC, a half wave plate filter, a Faraday rotator, a Pockels cell or a Kerr cell.

As shown in FIG. 4A, the first light 400 provided by the first LED module 40 is adapted to be split by the first PBS 415 into a first sub-transmitted light 400a and a first sub-reflected light 400b after traveling into the first polarizing device 411 of the first light guiding device 41 from the first incident surface 411a. When split by the first PBS 415, the first sub-transmitted light 400a is adapted to travel through the first PBS 415, while the first sub-reflected light 400b is adapted to be reflected by the first PBS 415. More specifically, the first sub-transmitted light 400a and the first sub-reflected light 400b are originally a parallel polarized light (P-polarized light) and a perpendicular polarized light (S-polarized light) respectively. Since the first phase switching device 47 is capable of being in the first status, i.e., the none-phase-switching status, the polarization of the first light 400 is not changed such that the first light 400 is adapted to travel into the third light guiding device 45 after traveling through the second light guiding device 43. Meanwhile, since the second phase switching device 49 is capable of being in the third status, i.e., the none-phase-switching status, the polarization of the first light 400 is not changed such that the first light 400 is adapted to emit out from the outlet surface 451a from the third light guiding device 45.

More specifically, after split from the first PBS 415, i.e., the MacNeille prism, the first sub-transmitted light 400a is adapted to travel through the first phase switching device 47 without changing of the polarization and travel into the second polarizing device 431. Because the first sub-transmitted light 400a is still a parallel polarized light at this moment, the first sub-transmitted light 400a is adapted to travel through the second PBS 435, which is a MacNeille prism, and travel towards the third light guiding device 45. Subsequently, the first sub-transmitted light 400a is adapted propagate in the following order: traveling through the second phase switching device 49 without changing the polarization, being reflected by the second reflector 457 of the second reflecting device 453, and traveling into the fourth polarizing device 451. Because the first sub-transmitted light 400a is still a parallel polarized light at this moment, the first sub-transmitted light 400a is adapted to travel through the fourth PBS 455 of the fourth polarizing device 451, which utilizes a MacNeille prism, and emit out from the outlet surface 451a.

On the other hand, after split from the first PBS 415 of the first polarizing device 411, the first sub-reflected light 400b is adapted to propagate in the following order: being reflected by the first reflector 417 of the first reflecting device 413, traveling through the first phase switching device 47 without changing of the polarization, and traveling into the third polarizing device 433. Because the first sub-reflected light 440b is still a perpendicular polarized light at this moment, the first sub-reflected light 440b is adapted to travel through the third PBS 437, which is a Bertrand-Feussner prism, and travel towards the third light guiding device 45. Subsequently, the first sub-reflected 400b is adapted to travel through the second phase switching device 49 without changing of the polarization and travel into the fourth polarizing device 451. Because the first sub-reflected light 400b is still a perpendicular polarized light at this moment, the first sub-reflected light 400b is adapted to be reflected by the fourth PBS 455, which utilizes a MacNeille prism, and emit out from the outlet surface 451a.

After being transmitted through the fourth PBS 455 and reflected from the fourth PBS 455 respectively, the first sub-transmitted light 400a and the first sub-reflected light 400b merge into the original first light 400 and emit out from the outlet surface 451a.

As shown in FIG. 4B, the second light 420 provided by the second LED module 42 is adapted to be split by the first PBS 415, which is a MacNeille prism, into a second sub-transmitted light 420b and a second sub-reflected light 420a after traveling into the first polarizing device 411 of the first light guiding device 41 from the second incident surface 411b. When split by the first PBS 415, the second sub-reflected light 420a is adapted to be reflected by the first PBS 415, while the second sub-transmitted light 420b is adapted to travel through the first PBS 415. More specifically, the second sub-transmitted light 420b and the second sub-reflected light 420a are originally a parallel polarized light (P-polarized light) and a perpendicular polarized light (S-polarized light) respectively. Because the first phase switching device 47 is capable of being in the second status, i.e., the phase-switching status, the polarization phase of the second light 420 is changed by the first phase switching device 47. Therefore, the second light 420 is adapted to travel into the third light guiding device 45. Meanwhile, because the second phase switching device 49 is capable of being in the third status, i.e., the none-phase-switching status, the polarization phase of the second light 420 is not changed by the second phase switching device 49. Therefore, the second light 420 is adapted to emit out from the outlet surface 451a of the third light guiding device 45.

More specifically, after split from the first PBS 415, which is a the MacNeille prism, the second sub-transmitted light 420b is adapted to propagate in the following order: being reflected by the first reflector 417 of the first reflecting device 413, traveling through the first phase switching device 47 and traveling into the third polarizing device 433. Because the second sub-transmitted light 420b is switched by the first phase switching device 47, the second sub-transmitted light 420b changes into a perpendicular polarized light from a parallel polarized light such that the second sub-transmitted light 420b is adapted to travel through the third PBS 437, which is a Bertrand-Feussner prism, and travel towards the third light guiding device 45. Furthermore, since the second phase switching device 49 is in the none-phase-switching status, the second sub-transmitted light 420b is not converted by the second phase switching device 49 and remains a perpendicular polarized light after traveling into the fourth polarizing device 451. Therefore, the second sub-transmitted light 420b is adapted to be reflected by the fourth PBS 455, which is a MacNeille prism, and emit out from the outlet surface 451a.

On the other hand, after split from the first PBS 415 of the first polarizing device 411, which utilizes a MacNeille prism, the second sub-reflected light 420a is adapted to travel through the first phase switching device 47 and travel into the second polarizing device 431. Because the second sub-reflected light 420a is converted into a parallel polarized light from a perpendicular polarized light by the first phase switching device 47, the second sub-reflected light 420a is adapted to travel through the second PBS 435, which is a MacNeille prism, and travel towards the third light guiding device 45. Subsequently, the second sub-reflected light 420a is adapted to travel through the second phase switching device 49, be reflected by the second reflector 457 of the second reflecting device 453 and travel into the fourth polarizing device 451. Because the second phase switching device 49 is in the none-phase-switching status at this moment, the second sub-reflected light 420a is not converted by the second phase switching device 49 and remains a parallel polarized light. Therefore, the second sub-reflected light 420a is adapted to travel through the fourth PBS 455, which is a MacNeille prism, and emit out from the outlet surface 451a.

Therefore, after being reflected from the fourth PBS 455, which is a MacNeille prism, and transmitted through the fourth PBS 455 respectively, the second sub-transmitted light 420b and the second sub-reflected light 420a merge into the original second light 420 and emit from the outlet surface 451a.

As shown in FIG. 4C, the third light 440 provided by the third LED module 44 is adapted to be split by the second PBS 435, which is a MacNeille prism, into a third sub-transmitted light 440b and a third sub-reflected light 440a after traveling into the second polarizing device 431 of the second light guiding device 43 from the third incident surface 433a. When split by the second PBS 435, the third sub-reflected light 440a is adapted to be reflected by the second PBS 435, while the third sub-transmitted light 440b is adapted to travel the second PBS 435. More specifically, the third sub-transmitted light 440b and the third sub-reflected light 440a are originally a parallel polarized light (P-polarized light) and a perpendicular polarized light (S-polarized light) respectively. Since at this moment the second phase switching device 49 is capable of being in the fourth status, i.e., the phase-switching status, the third light 440 is adapted to emit out from the outlet surface 451a after traveling through the third light guiding device 45. Meanwhile, the third light 440 is unaffected by the status of the first phase switching device 47, i.e., the first switching device 47 may stay in either the phase-switching or the none-phase-switching status.

More specifically, because the third sub-transmitted light 440b is a parallel polarized light after split from the second PBS 435, the third sub-transmitted light 440b is adapted to be reflected by the third PBS 437, i.e., the Bertrand-Feussner prism, of the third polarizing device 433, and travel towards the third light guiding device 45. When traveling through the second phase switching device 49, the third sub-transmitted light 440b is converted into a perpendicular polarized light from a parallel polarized light. Therefore, the third sub-reflected light 440b is adapted to be reflected by the fourth PBS 455, which utilizes a MacNeille prism, of the fourth polarizing device 451 and emit out from the outlet surface 451a.

On the other hand, after split from the second PBS 435, which is a MacNeille prism, the third sub-reflected light 440a is adapted to travel towards the third light guiding device 45. When traveling through the second phase switching device 49, the third sub-reflected light 440a is converted into a parallel polarized light from a perpendicular polarized light by second phase switching device 49, which is in the fourth status. Subsequently, the third sub-reflected light 440a is adapted to be reflected by the second reflector 457 of the second reflecting device 453 and travel into the fourth polarizing device 451. Because the third sub-reflected light 440b is a parallel polarized light at this moment, the third sub-reflected light 440a is adapted to travel through the fourth PBS 455 and emit out from the outlet surface 451a. After being reflected from the fourth PBS 455 and transmitted through the fourth PBS 455 respectively, the third sub-transmitted light 440b and the third sub-reflected light 440a merge into the original third light 440 and emit out from the outlet surface 451a.

Likewise, the light source switching device 4 of this embodiment may be applied to a projection system. The projection system comprises a first LED module, a second LED module, a third LED module, a TIR prism, a DMD and a projection lens. The operational principal and arrangement of interior elements thereof will be appreciated by those skilled in the art, and thus will not be further described herein.

This invention is not limited to the combination of the particular number of the light source guiding devices and the phase switching devices described in the above embodiments. The aforementioned elements may also be replaced by other elements with the same functionalities. Therefore, other embodiments of this invention will be readily recognized by those skilled in the art.

For example, all of the polarizing devices in the embodiments described hereinabove can be replaced with the polarizing devices with the contrary function at the same time, i.e., replacing the MacNeille prism, which allows the transmission for a parallel polarized light and reflects a perpendicular polarized light, with a Bertrand-Feussner prism, which reflects the parallel polarized light and allows the transmission for a perpendicular polarized light, and replacing the Bertrand-Feussner prism with a MacNeille prism vice versa. At this moment, the polarization state of all of the sub-transmitted light and the sub-reflected light described in the embodiments hereinabove turns into the exactly opposite polarization state, that is, the perpendicular polarized light and the parallel polarized light are turned into a parallel polarized light and a perpendicular polarized light respectively. Meanwhile, if the switching operation of all the phase switching devices remains in the same way as in the embodiments described hereinabove, the sub-transmitted light and the sub-reflected light are still able to follow the same optical paths to achieve the purpose of switching light source. The detailed optical paths and principles of the switching operation are similar to those described in the embodiments hereinabove, and therefore will not be discussed further in detail.

The light source switching device of this invention allows more flexibility for arrangement for the light source of the projection system. Redirected by the light source switching devices, light emitted from the light sources disposed in different orientations and locations can emit out from the same plane. Because the phase switching devices and emitting of the light sources are both controlled by electrical signals, a rapid and well coordinated response is achieved, and the manufacturing errors and abrasions during use are avoided. By using the light source switching device, the projection system can deliver a more continuous light flux, a faster light source switching speed, a smaller overall size and simpler element arrangement without using a mirror wheel as in the conventional projection system. Additionally, this light source switching device may further be used as a light integration rod which can improve the brightness by several times even without increasing the etendue.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A light source switching device adapted for a projection system, wherein the projection system is adapted to alternately provide a first light, a second light and a third light, the light source switching device comprising:
   a first light guiding device, having a first incident surface and a second incident surface, which is not parallel to the first incident surface;
   a second light guiding device, having a third incident surface, which is not parallel to one of the first incident surface and the second incident surface;
   a third light guiding device, having an outlet surface;
   a first phase switching device, disposed between the first light guiding device and the second light guiding device, the first phase switching device being adapted to be in one of a first status and a second status; and
   a second phase switching device, disposed between the second light guiding device and the third light guiding device, the second phase switching device being adapted to be in one of a third status and a fourth status;

wherein when the first light travels into the first light guiding device from the first incident surface, the first phase switching device is capable of being in the first status thereof such that the first light is adapted to travel into the third light guiding device after traveling through the second light guiding device, and meanwhile the second phase switching device is capable of being in the third status thereof such that the first light is adapted to emit out from the outlet surface after traveling through the third light guiding device;

when the second light travels into the first light guiding device from the second incident surface, the first phase switching device is capable of being in the second status thereof such that the second light is adapted to travel into the third light guiding device after traveling through the second guiding device, and meanwhile the second phase switching device is capable of being in the third status thereof such that the second light is adapted to emit out from the outlet surface after traveling through the third light guiding device; and when the third light travels into the second light guiding device from the third incident surface, the second phase switching device is capable of being in the fourth status thereof such that the third light is adapted to emit out from the outlet surface after traveling through the third light guiding device.

2. The light source switching device as claimed in claim 1, wherein the first light guiding device comprises a first polarizing device and a first reflecting device, which is disposed adjacent to the first polarizing device, and the first polarizing device defines the first incident surface and the second incident surface;

the second light guiding device comprises a second polarizing device and a third polarizing device, which is disposed adjacent to the second polarizing device, and the second polarizing device defines the third incident surface; and the third light guiding device comprises a fourth polarizing device and the second reflecting device, which is disposed adjacent to the fourth polarizing device, and the fourth polarizing device defines the outlet surface;

the first light is adapted to be split into a first sub-transmitted light and a first sub-reflected light after traveling into the first polarizing beam splitter from the first incident surface, wherein the first sub-transmitted light is adapted to travel through the first phase switching device, the second polarizing device and the second phase switching device, be reflected by the second reflecting device, travel into the fourth polarizing device and emit out from the outlet surface; and the first sub-reflected light is adapted to be reflected by the first reflecting device, travel through the first phase switching device, the third polarizing device and the second phase switching device, travel into the fourth polarizing device and emit out from the outlet surface;

the second light is adapted to be split into a second sub-transmitted light and a second sub-reflected light after traveling into the first polarizing device from the second incident surface, wherein the second sub-transmitted light is adapted to be reflected by the first reflecting device, travel through the first phase switching device, the third polarizing device and the second phase switching device, travel into the fourth polarizing device and emit out from the outlet surface; and the second sub-reflected light is adapted to travel through the first phase switching device, the second polarizing device and the second phase switching device, be reflected by the second reflecting device, travel into the fourth polarizing device and emit out from the outlet surface; and the third light is adapted to be split into a third sub-transmitted light and a third sub-reflected light after traveling into the second polarizing device from the third incident surface, wherein the third sub-transmitted light is adapted to be reflected by the third polarizing device, travel through the second phase switching device, travel into the fourth polarizing device and emit out from the outlet surface; and the third sub-reflected light is adapted to travel through the second phase switching device, be reflected by the second reflecting device, travel into the fourth polarizing device and emit out from the outlet surface.

3. The light source switching device as claimed in claim 2, wherein:

the first polarizing device, the second polarizing device and the fourth polarizing device are adapted to reflect perpendicular polarized light (S-polarized light), and allow the transmission of parallel polarized light (P-polarized light); and the third polarizing is adapted to reflect parallel polarized light (P-polarized light) and allow the transmission of perpendicular polarized light (S-polarized light).

4. The light source switching device as claimed in claim 2, wherein the first polarizing device comprises a first polarizing beam splitter;

the first reflecting device comprises a first reflector;

the second polarizing device comprises a second polarizing beam splitter;

the third polarizing device comprises a third polarizing beam splitter;

the fourth polarizing device comprises a fourth polarizing beam splitter; and the second reflecting device comprises a second reflector;

the first sub-transmitted light and the first sub-reflected light are split by the first polarizing beam splitter, wherein the first sub-transmitted light is adapted to travel through the first polarizing beam splitter, the first phase switching device, the second polarizing beam splitter and the second phase switching device, be reflected by the second reflector, travel through the fourth polarizing beam splitter and emit out from the outlet surface; and the first sub-reflected light is adapted to be reflected by the first polarizing beam splitter and the first reflector, travel through the first phase switching device, the third polarizing beam splitter and the second phase switching device, be reflected by the fourth polarizing beam splitter and emit out from the outlet surface;

the second sub-transmitted light and the second reflected light are split by the first polarizing beam splitter, wherein the second sub-transmitted light is adapted to travel through the first polarizing beam splitter, be reflected by the first reflector, travel through the first phase switching device, the third polarizing beam splitter and the second phase switching device, be reflected by the fourth polarizing beam splitter and emit out from the outlet surface; and the second sub-reflected light is adapted to be reflected by the first polarizing beam splitter, travel through the first phase switching device, the second polarizing beam splitter and the second phase switching device, be reflected by the second reflector, travel through the fourth polarizing beam splitter and emit out from the outlet surface; and the third sub-transmitted light and the third sub-reflected light are split by the second polarizing beam splitter, wherein
  the third sub-transmitted light is adapted to travel through the second polarizing beam splitter, be reflected by the third polarizing beam splitter, travel through the second phase switching device, be reflected by the fourth polarizing beam splitter and emit out from the outlet surface; and
  the third sub-reflected light is adapted to be reflected by the second polarizing beam splitter, travel through the second phase switching device, be reflected by the second reflector, travel through the fourth polarizing beam splitter and emit out from the outlet surface.

5. The light source switching device as claimed in claim 4, wherein
  the first polarizing beam splitter, the second polarizing beam splitter, the third polarizing beam splitter and the fourth polarizing beam splitter are all cuboids and have a first diagonal inclined plane, a second diagonal inclined plane, a third diagonal inclined plane and a fourth diagonal inclined plane respectively;
  the first polarizing beam splitter, the second polarizing beam splitter, the third polarizing beam splitter and the fourth polarizing beam splitter further have a first polarizing beam splitting plane, a second polarizing beam splitting plane, a third polarizing beam splitting plane and a fourth polarizing beam splitting plane respectively; and
  the first polarizing beam splitting plane, the second polarizing beam splitting plane, the third polarizing beam splitting plane and the fourth polarizing beam splitting plane are disposed on the first diagonal inclined plane, the second diagonal inclined plane, the third diagonal inclined plane and the fourth diagonal inclined plane respectively.

6. The light source switching device as claimed in claim 4, wherein the first reflecting device and the second reflecting device are both triangular prisms, having a first inclined plane and a second inclined plane respectively, and the first reflector and the second reflector are disposed on the first inclined plane and the second inclined plane respectively.

7. The light source switching device as claimed in claim 2, wherein the first sub-transmitted light, the second sub-transmitted light and the third sub-transmitted light are parallel polarized lights (P-polarized lights), and the first sub-reflected light, the second sub-reflected light and the third sub-reflected light are perpendicular polarized lights (S-polarized lights).

8. The light source switching device as claimed in claim 1, wherein when one of the first status and the second status is phase-switching status, the other is non-phase-switching status; and when one of the third status and the fourth status is phase-switching status, the other is non-phase-switching status.

9. The light source switching device as claimed in claim 1, wherein the first light, the second light and the third light are provided by a first light emitting diode module, a second light emitting diode module and a third light emitting diode module respectively, each of the light emitting diode modules has a red light emitting diode, a blue light emitting diode and a green light emitting diode.

10. The light source switching device as claimed in claim 1, wherein the first light, the second light and the third light are provided alternately according to a time sequence.

11. The light source switching device as claimed in claim 10, wherein the first status, the second status and the third status are provided according to the time sequence.

12. The light source switching device as claimed in claim 1, wherein the second light guiding device comprises a Mac-Neille prism and a Bertrand-Feussner prism.

* * * * *